(12) United States Patent
Sayo

(10) Patent No.: US 10,381,751 B2
(45) Date of Patent: Aug. 13, 2019

(54) BRANCH STRUCTURE OF LAMINATED FLAT ELECTRIC WIRE

(71) Applicant: TOYOTA JIDOSHA KABUSHIKI KAISHA, Toyota (JP)

(72) Inventor: Takashi Sayo, Kasugai (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/152,507

(22) Filed: Oct. 5, 2018

(65) Prior Publication Data

US 2019/0165494 A1 May 30, 2019

(30) Foreign Application Priority Data

Nov. 27, 2017 (JP) ................................. 2017-226856

(51) Int. Cl.
| | | |
|---|---|---|
| *H01R 4/30* | (2006.01) | |
| *H02G 3/16* | (2006.01) | |
| *H01B 7/08* | (2006.01) | |
| *H01R 11/12* | (2006.01) | |
| *B60R 16/02* | (2006.01) | |

(52) U.S. Cl.
CPC ................. *H01R 4/30* (2013.01); *H01B 7/08* (2013.01); *H01R 11/12* (2013.01); *H02G 3/16* (2013.01); *B60R 16/02* (2013.01); *H01R 2201/26* (2013.01)

(58) Field of Classification Search
CPC . H01R 4/30; H01R 11/12; H01B 7/08; H02G 3/16; H05K 1/14; H05K 1/142; H05K 1/145; H05K 1/147
See application file for complete search history.

(56) References Cited

U.S. PATENT DOCUMENTS

| | | | |
|---|---|---|---|
| 3,466,745 A * | 9/1969 | Stopp ...................... | H01B 7/00 |
| | | | 174/117 FF |
| 2018/0118138 A1* | 5/2018 | Tsukamoto .............. | H01R 4/34 |
| 2018/0174716 A1* | 6/2018 | Kominato ............ | H01R 11/288 |
| 2018/0309281 A1* | 10/2018 | Ichikawa .......... | H01M 10/6553 |

(Continued)

FOREIGN PATENT DOCUMENTS

| | | |
|---|---|---|
| JP | 10-509835 | 9/1998 |
| JP | 2000-209739 | 7/2000 |

(Continued)

*Primary Examiner* — Timothy J Thompson
*Assistant Examiner* — Amol H Patel
(74) *Attorney, Agent, or Firm* — Oblon, McClelland, Maier & Neustadt, L.L.P.

(57) ABSTRACT

A branch structure of a laminated flat electric wire includes: a laminated flat electric wire in which two or more plate-shaped flat electric wires are laminated; and a branch box. The laminated flat electric wire has tabs each extending from each of the flat electric wires. Each of the tabs is provided with a hole. The branch box has the same number of rod-shaped members as the number of tabs, and the rod-shaped members are disposed at positions corresponding to the positions of the holes of the tabs. Two or more laminated flat electric wires are fixed to each other by passing each of the rod-shaped members through a corresponding hole of the tabs in a state where the two or more laminated flat electric wires extend from the branch box in opposite directions from each other or directions orthogonal to each other.

4 Claims, 5 Drawing Sheets

(56) References Cited

U.S. PATENT DOCUMENTS

2018/0316146 A1* 11/2018 Kato .................... H01R 4/34
2019/0067839 A1*  2/2019 Ozaki ................... H01R 4/58

FOREIGN PATENT DOCUMENTS

| | | |
|---|---|---|
| JP | 2011-3402 | 1/2011 |
| JP | 2017-136926 | 8/2017 |
| JP | 2018-101600 | 6/2018 |
| WO | WO 96/17413 | 6/1996 |

* cited by examiner

BRANCH STRUCTURE OF LAMINATED FLAT ELECTRIC WIRE

INCORPORATION BY REFERENCE

The disclosure of Japanese Patent Application No. 2017-226856 filed on Nov. 27, 2017 including the specification, drawings and abstract is incorporated herein by reference in its entirety.

BACKGROUND

1. Technical Field

The disclosure relates to a branch structure of a laminated flat electric wire that is mounted on a vehicle or the like.

2. Description of Related Art

In a vehicle, a plurality of electric wires needed to supply electric power from a battery or an alternator, which is a main power supply, to various electrical components or to exchange signals between the electrical components is mounted. Various trunk line structures and branch structures for simplifying a mounting structure of electric wires in a vehicle have been proposed (Japanese Unexamined Patent Application Publication No. 2017-136926 (JP 2017-136926 A)).

Further, as an electric wire that is used in a vehicle or the like, a laminated flat electric wire has been proposed in which a plurality of band-shaped flat electric wires is laminated in a state of being insulated from each other.

SUMMARY

In a case of branching the laminated flat electric wire, it is conceivable to provide a branch structure for fixing a bus bar corresponding to each flat electric wire and each flat electric wire by a bolt. One example of the branch structure as described above is shown in FIG. 5A to FIG. 5C. FIG. 5A is a perspective view of a laminated flat electric wire 901, FIG. 5B is an exploded perspective view of a branch box 951, and FIG. 5C is a plan view showing a state where the laminated flat electric wires 901 are mounted on the branch box 951.

The laminated flat electric wire 901 includes four flat electric wires 902 (902-1 to 902-4), as an example. The respective flat electric wires have insulating layers and are laminated in a state of being insulated from each other. The flat electric wires 902-1 to 902-4 include, at end edges in an extending direction thereof, tabs 903 (903-1 to 903-4) extending so as not to overlap each other when viewed in a direction along a lamination direction thereof. Each of the tabs 903 has a hole, as an example, and an insulating layer is not formed on the tab 903.

The branch box 951 has four bus bars 952 (952-1 to 952-4) respectively corresponding to the flat electric wires 902-1 to 902-4, between a substrate 954 and a lid 955. The bus bars 952-1 to 952-4 have insulating layers and are laminated in a state of being insulated from each other. Each of the bus bars 952-1 to 952-4 has a shape in which tabs 953 (953-1 to 953-4) extend from four sides forming a rectangular shape. Each of the tabs 953 has a hole, as an example, and an insulating layer is not formed on the tab 953.

By preparing a plurality of laminated flat electric wires 901 and fixing the respective tabs 903-1 to 903-4 and the tabs 953-1 to 953-4 of the bus bars 952-1 to 952-4 corresponding thereto with screws 956 or bolts or the like, which pass through the respective holes, it is possible to electrically connect the laminated flat electric wires 901 to each other and branch wiring in the extending direction or orthogonal directions. However, in order to connect four laminated flat electric wires 901 to the branch box 951, since screw-fixing points are as many as 16 (a value obtained by multiplying the number of flat electric wires that are included in the laminated flat electric wire by the number of branches), the number of steps for mounting is increased. A large number of bus bars or bolts are needed, the structure becomes complicated, and the volume or weight of a part is heavy, which becomes a hindrance to mounting on a vehicle.

The disclosure provides a simplified branch structure of a laminated flat electric wire.

An aspect of the disclosure relates to a branch structure of a laminated flat electric wire. The branch structure includes a laminated flat electric wire in which two or more plate-shaped flat electric wires are laminated, and a branch box. The laminated flat electric wire has, at at least one end in an extending direction, tabs each extending from each of the flat electric wires. Each of the tabs is provided with a hole, the tabs are provided so as not to overlap each other in a plan view as viewed in a direction along a lamination direction of the laminated flat electric wire, and the holes of the tabs are disposed at positions different from each other in a direction orthogonal to the extending direction of the laminated flat electric wire. The branch box has the same number of rod-shaped members as the number of tabs, and the rod-shaped members are disposed at positions corresponding to the positions of the holes of the tabs. The branch structure is configured such that the tabs through which the same rod-shaped member passes are electrically connected to each other by fixing two or more laminated flat electric wires to each other by passing each of the rod-shaped members through a corresponding hole of the tabs in a state where the two or more laminated flat electric wires extend from the branch box in opposite directions from each other or directions orthogonal to each other.

According to the aspect of the disclosure, it is possible to connect two or more laminated flat electric wires to each other by the same number of rod-shaped members as the number of flat electric wires that are included in the laminated flat electric wire, it is possible to simplify the structure by reducing the number of parts, and it is possible to reduce the volume and weight of the branch box. Further, it is possible to reduce the number of steps for mounting.

In the branch structure according to the aspect of the disclosure, the tabs of the laminated flat electric wire may have different lengths and be provided to be arranged in order of a length in a width direction of the laminated flat electric wire in the plan view as viewed in the direction along the lamination direction of the laminated flat electric wire. The hole may be provided in a vicinity of a tip portion of the tab. In a set of laminated flat electric wires that is mounted in a state of extending in opposite directions from each other from the branch box, in the laminated flat electric wire on one side, each of the rod-shaped members may pass through the tab in length order starting from the shortest tab, from a first end toward a second end of disposition of the rod-shaped members, and in the laminated flat electric wire on the other side, each of the rod-shaped members may pass through the tab in length order starting from the longest tab, from the first end toward the second end of disposition of the rod-shaped members. The tabs of the respective laminated flat electric wires, through which the same rod-shaped member passes, may extend from the flat electric wires that are at the same lamination position.

According to the aspect of the disclosure, it is possible to overlap the tabs in a state where the thickness is suppressed, with a small amount of deformation in the set of the laminated flat electric wires that are mounted in a state of extending in opposite directions from each other from the branch box.

In the branch structure according to the aspect of the disclosure, the holes of the tabs may be disposed at predetermined intervals on a straight line having an inclination of 45° with respect to the extending direction of the laminated flat electric wire in the plan view as viewed in the direction along the lamination direction of the laminated flat electric wire, and four or less laminated flat electric wires may be fixed to the branch box.

According to the aspect of the disclosure, it is possible to fix the laminated flat electric wires in the maximum four directions as viewed from the branch box.

In the branch structure according to the aspect of the disclosure, the rod-shaped member may be a bolt.

According to the aspect of the disclosure, it is possible to provide a simplified branch structure of a laminated flat electric wire, in which it is possible to reduce the volume, the weight, and the number of steps for mounting.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Overview

In a branch structure of a laminated flat electric wire according to an embodiment of the disclosure, each flat electric wire that is included in the laminated flat electric wire has one tab. A branch box has the same number of bolts as the number of flat electric wires that are included in the laminated flat electric wire. The tabs are overlapped with each other in a state where two or more laminated flat electric wires extend in opposite directions from each other or directions orthogonal to each other when viewed from the branch box, and the bolts of the branch box are passed through and fixed to the overlapped tabs, whereby the overlapped tabs can be connected to each other. By the above, the number of parts and the number of steps for mounting can be reduced rather than using a branch box of the related, which uses a bus bar.

Embodiment

Hereinafter, an embodiment of the disclosure will be described in detail with reference to the drawings.

Configuration

Figure 1:
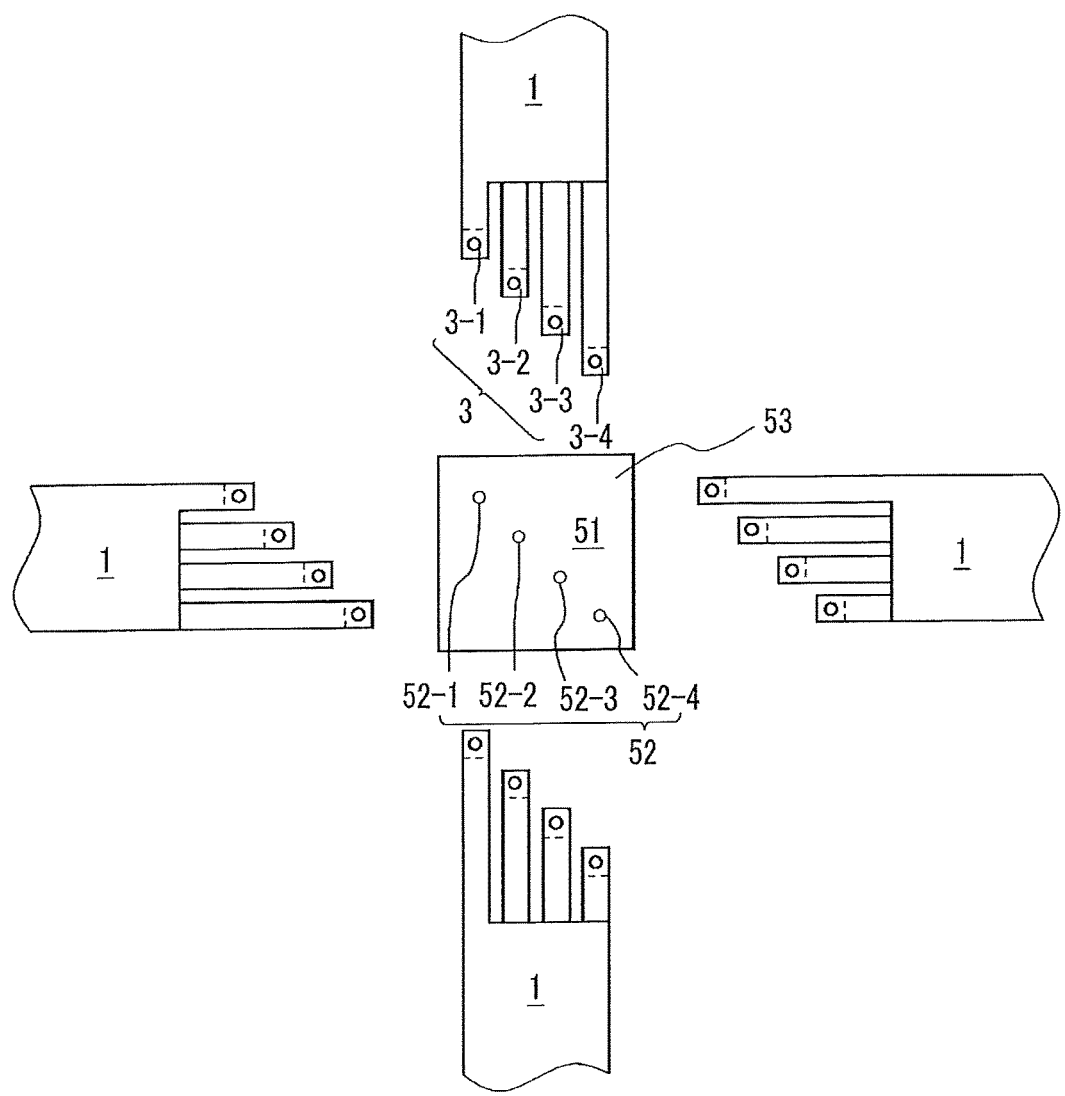
FIG. 1 is a schematic plan view of a branch structure by a laminated flat electric wire and a branch box according to an embodiment of the disclosure.

FIG. 1 is a schematic plan view for describing a branch structure made by a laminated flat electric wire 1 and a branch box 51 in the embodiment of the disclosure. The detailed structure of a casing, a lid, or the like of the branch box 51 is not particularly limited, and thus illustration thereof is omitted. As rod-shaped members, for example, four bolts 52 (52-1 to 52-4) are provided at equal intervals on a straight line, as an example, on a substrate 53 of the branch box 51. The bolt 52 is a stud bolt, as an example, has one end that is mounted in a screw hole provided in the substrate 53, and is provided perpendicular to the substrate 53. The laminated flat electric wire 1 has, at one end in an extending direction thereof, tabs 3 (3-1 to 3-4) each extending from each of, for example, four flat electric wires. The tabs 3-1, 3-2, 3-3, 3-4 become longer in this order, as an example, and a hole is provided in the vicinity of a tip portion of each of the tabs 3-1, 3-2, 3-3, 3-4. The tabs 3-1 to 3-4 are provided so as not to overlap each other, in the order of a length along a width direction of the laminated flat electric wire 1, in a plan view as viewed in a direction along a lamination direction of the laminated flat electric wire 1.

The holes of the tabs 3-1 to 3-4 are disposed at positions different from each other in a plan view with respect to a direction orthogonal to the extending direction of the laminated flat electric wire 1. For example, the holes of the tabs 3-1 to 3-4 are disposed at the same intervals as the bolts 52-1 to 52-4 of the branch box 51 on a straight line having an inclination of 45° with respect to the extending direction of the laminated flat electric wire 1 in a plan view of the laminated flat electric wire 1. The laminated flat electric wire 1 is mounted on the branch box 51 by passing the bolts 52-1 to 52-4 of the branch box 51 through the respective holes of the tabs 3-1 to 3-4. By mounting and fixing two or more laminated flat electric wires 1 in a state of extending in opposite directions from each other or directions orthogonal to each other from the branch box 51, the tabs 3-1 to 3-4 through which the same bolts among the bolts 52-1 to 52-4 pass are electrically connected to each other, so that the laminated flat electric wires 1 can be connected to each other.

FIG. 2A to FIG. 2D show examples of a lamination pattern of flat electric wires 2 in the laminated flat electric wire 1. Each of laminated flat electric wires 1A, 1B, 1C, 1D shown in FIG. 2A to FIG. 2D is configured by laminating flat electric wires 2-1 to 2-4. The flat electric wires 2-1 to 2-4 have the tabs 3-1 to 3-4. The flat electric wires 2-1 to 2-4 have insulating layers and are insulated from each other. Although there is no particular limitation, it is preferable that an insulating layer is not formed at a peripheral portion of the hole on the surface of each tab 3 such that electrical conduction is made at the time of contact with each tab 3 of another laminated flat electric wire 1, as will be described later. Plating treatment may be performed on the hole and the peripheral portion of the hole in order to improve electrical conductivity. However, in a case where the inner peripheral surface of the hole of each tab 3 is not insulated, the bolt 52 has electrical conductivity, and the conduction between the tabs 3 can be sufficiently made by the contact of the bolt 52 with the inner peripheral surface, an insulating layer may be provided on the surface of the tab 3. The laminated flat electric wire 1 may be further covered with resin or the like or may be provided with other accessories.

Figure 2A:
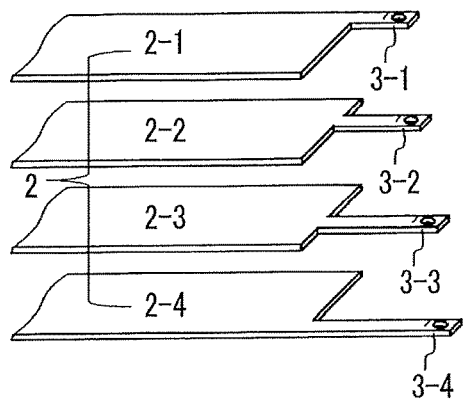
FIG. 2A is a diagram showing an example of a lamination pattern of flat electric wires in a laminated flat electric wire according to an embodiment of the disclosure.
Figure 2C:
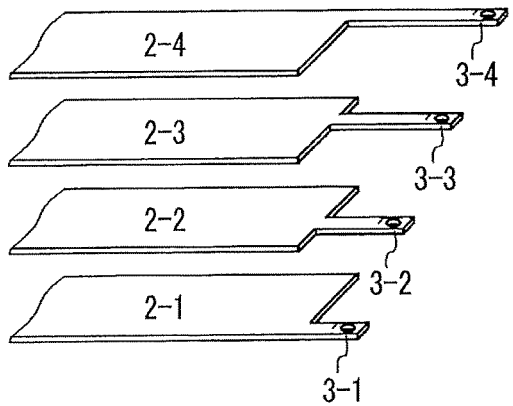
FIG. 2C is a diagram showing an example of a lamination pattern of flat electric wires in a laminated flat electric wire according to an embodiment of the disclosure.
Figure 2B:
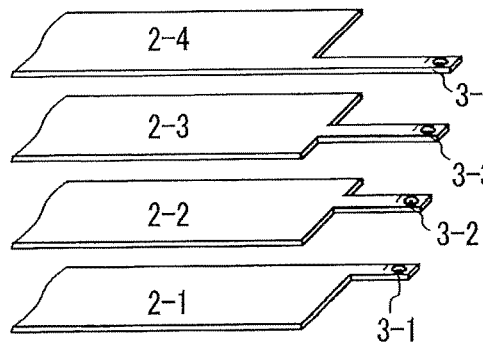
FIG. 2B is a diagram showing an example of a lamination pattern of flat electric wires in a laminated flat electric wire according to an embodiment of the disclosure.
Figure 2D:
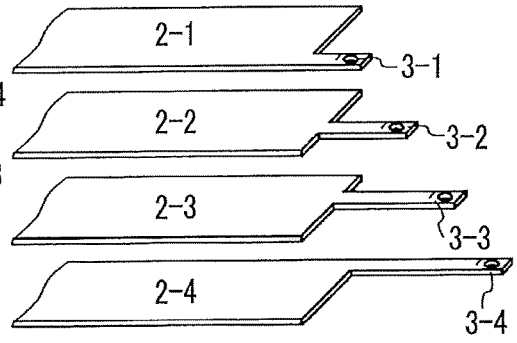
FIG. 2D is a diagram showing an example of a lamination pattern of flat electric wires in a laminated flat electric wire according to an embodiment of the disclosure.

In both the laminated flat electric wires 1A, 1D shown in FIG. 2A and FIG. 2D, the flat electric wires 2-1, 2-2, 2-3, 2-4 are laminated in order from above (one side in the lamination direction). In the laminated flat electric wire 1A, the tabs 3-1, 3-2, 3-3, 3-4 are arranged in order from one side toward the other side in the width direction when viewed from above (from the back side toward the front side of the plane of the drawing). In contrast to this, in the laminated flat electric wire 1D, the tabs 3-1, 3-2, 3-3, 3-4 are arranged in order from the other side toward one side in the width direction when viewed from above (from the front side toward the back side of the plane of the drawing).

In both the laminated flat electric wires 1B, 1C shown in FIG. 2B and FIG. 2C, the flat electric wires 2-4, 2-3, 2-2, 2-1 are laminated in order from above (one side in the lamination direction). In the laminated flat electric wire 1B, the tabs 3-1, 3-2, 3-3, 3-4 are arranged in order from one side toward the other side in the width direction when viewed from above (from the back side toward the front side of the plane of the drawing). In contrast to this, in the laminated flat electric wire 1C, the tabs 3-1, 3-2, 3-3, 3-4 are arranged in order from the other side toward one side in the width direction when viewed from above (from the front side toward the back side of the plane of the drawing).

As the lamination pattern of the flat electric wires 2, the reversed form of the laminated flat electric wire 1A is the same as the laminated flat electric wire 1C, and the reversed form of the laminated flat electric wire 1B is the same as the laminated flat electric wire 1D. For this reason, the laminated flat electric wire 1A may be reversed and used as the laminated flat electric wire 1C, and the laminated flat electric wire 1B may be reversed and used as the laminated flat electric wire 1D.

In a case where two laminated flat electric wires extend in opposite directions from each other when viewed from the branch box 51, for example, a set of laminated flat electric wires 1A and 1A or a set of laminated flat electric wires 1A and 1B can be used.

In a case where two laminated flat electric wires extend in directions orthogonal to each other when viewed from the branch box 51, for example, a set of laminated flat electric wires 1A and 1C (the reversed form of 1A) can be used for one direction of two orthogonal directions, and a set of laminated flat electric wires 1A and 1D (the reversed form of 1B) can be used for the other direction.

That is, by preparing, for example, two types of laminated flat electric wires 1A and 1B as the laminated flat electric wires 1, it is possible to branch the laminated flat electric wires 1 with respect to three directions; the extending direction thereof and two orthogonal directions.

Figure 3A:
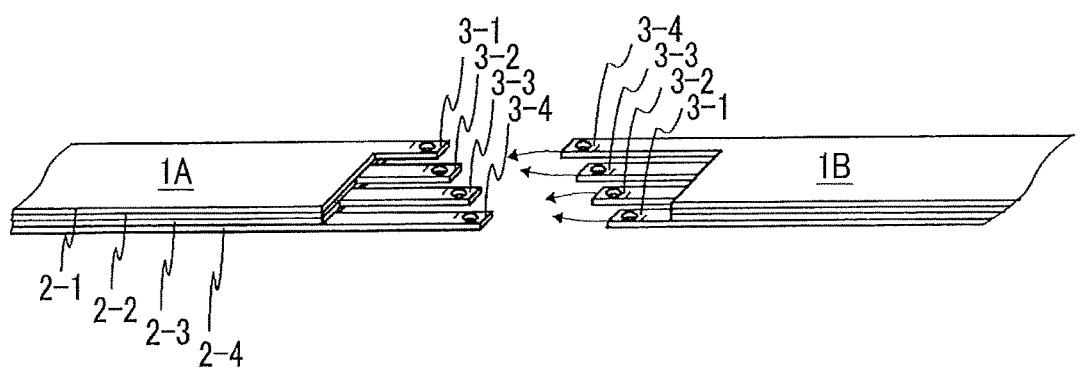
FIG. 3A is a diagram showing an example of combining two laminated flat electric wires according to an embodiment of the disclosure.
Figure 3B:
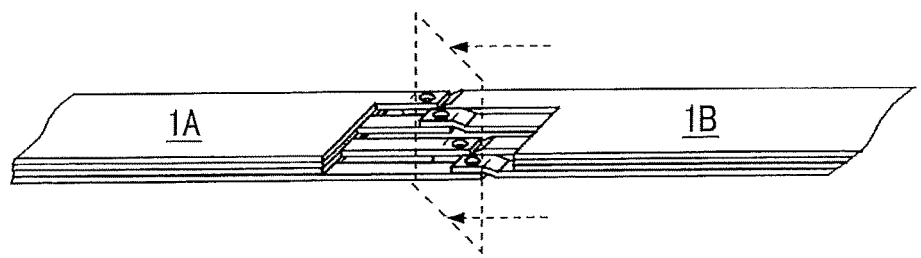
FIG. 3B is a diagram showing the example of combining two laminated flat electric wires according to an embodiment of the disclosure.
Figure 3C:
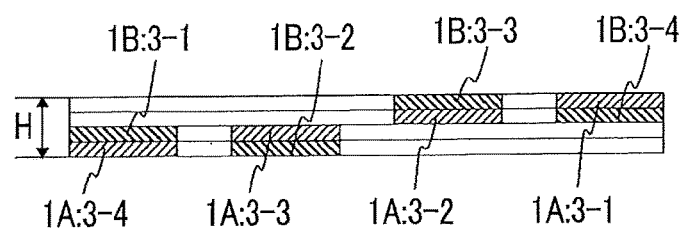
FIG. 3C is a diagram showing the example of combining two laminated flat electric wires according to an embodiment of the disclosure.

In a case where two laminated flat electric wires 1 are mounted so as to extend in opposite directions from each other when viewed from the branch box 51, although there is no particular limitation, it is preferable to combine two laminated flat electric wires 1 before mounting the two laminated flat electric wires 1 on the branch box 51. FIG. 3A to FIG. 3C show an example of combining two laminated flat electric wires 1A, 1B. As shown in FIG. 3A, the laminated flat electric wire 1A has the flat electric wires 2-1, 2-2, 2-3, 2-4 laminated in this order from above. The laminated flat electric wire 1B has the flat electric wires 2-4, 2-3, 2-2, 2-1 laminated in this order from above. For this reason, the tabs 3-1, 3-2, 3-3, 3-4 of the laminated flat electric wire 1A respectively face the tabs 3-4, 3-3, 3-2, 3-1 of the laminated flat electric wire 1B. Here, the tabs 3-4, 3-3, 3-2, 3-1 of the laminated flat electric wire 1B respectively overlap the tabs 3-1, 3-2, 3-3, 3-4 of the laminated flat electric wire 1A with the respective tips of the tabs 3-4, 3-3, 3-2, 3-1 of the laminated flat electric wire 1B deformed so as to be placed below, above, below, and above the tabs 3-1, 3-2, 3-3, 3-4 of the laminated flat electric wire 1A, respectively. The same bolt 52 is passed through the overlapped tabs 3. The laminated flat electric wires 1A, 1B in a combined state is shown in FIG. 3B. Each tab 3 has a thickness of, for example, about 1.5 mm, and thus it is possible to deform the tip portion by an amount corresponding to the thickness of one tab even with a relatively small force such as a human finger's force, as shown in FIG. 3B. FIG. 3C shows a see-through sectional view of the overlapping portions of the respective tabs 3 surrounded by a broken line in FIG. 3B, as viewed in the direction along the extending direction of the laminated flat electric wires 1A, 1B. As shown in FIG. 3C, in each tab 3, the tabs 3 facing each other can overlap each other with a small amount of deformation within a range that does not exceed a height range H of the laminated flat electric wires 1A, 1B.

As shown in FIG. 1, in a set of laminated flat electric wires 1 that is mounted in a state of extending in opposite directions from each other from the branch box 51, in the laminated flat electric wire 1 on one side, each of the bolts 52 passes through the tab 3 in length order starting from the shortest tab 3, from the bolt 52-1 disposed at a first end toward the bolt 52-4 disposed at a second end, and in the laminated flat electric wire 1 on the other side, each of the bolts 52 passes through the tab 3 in length order starting from the longest tab 3, from the bolt 52-1 disposed at the first end toward the bolt 52-4 disposed at the second end. Among the combinations as described above, in particular, as in the set of laminated flat electric wires 1A and 1B described above, by selecting a set in which each tab 3 through which the same bolt 52 passes extends from the flat electric wire 2 that is at the same position (the same lamination order or height) along the lamination direction of each of the laminated flat electric wires 1A and 1B, it is possible to make a combination having a suppressed thickness, with a small amount of deformation, before mounting the set on the branch box 51.

Figure 4A:
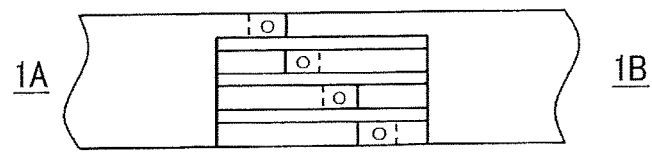
FIG. 4A is a diagram showing sets of laminated flat electric wires according to an embodiment of the disclosure are mounted on a branch box.
Figure 4B:
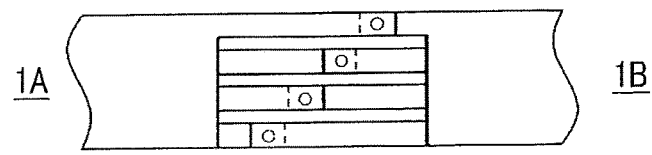
FIG. 4B is a diagram showing a state where sets of laminated flat electric wires according to an embodiment of the disclosure are aligned.
Figure 4B:
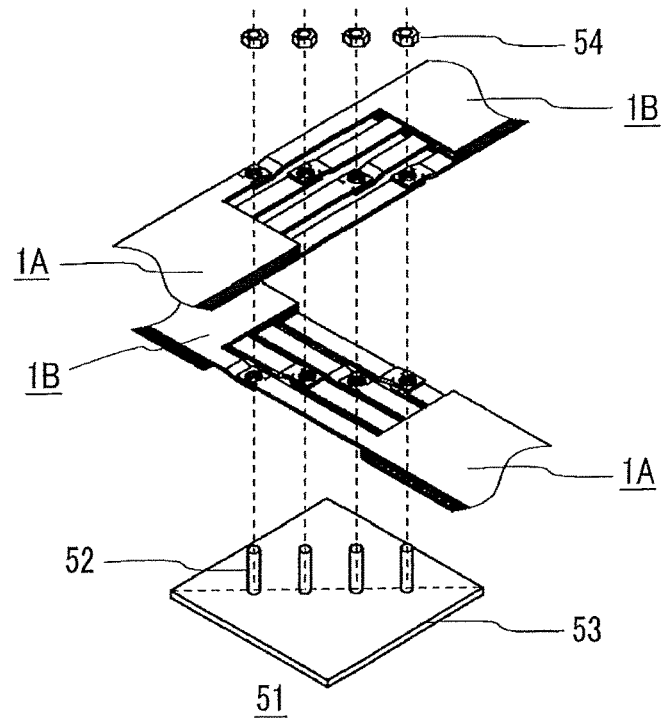
Figure 4C:
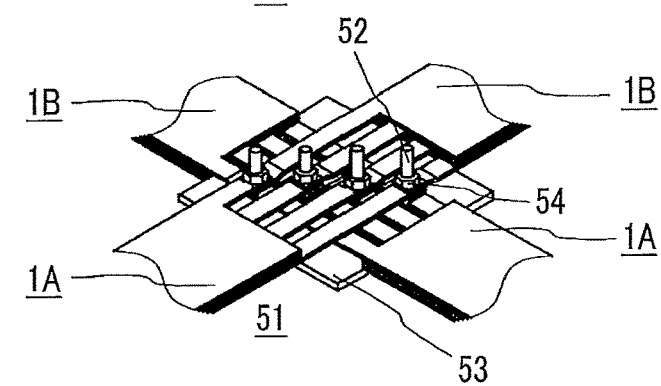
FIG. 4C is a diagram showing a state where sets of laminated flat electric wires according to an embodiment of the disclosure are mounted on a branch box.
Figure 5A:
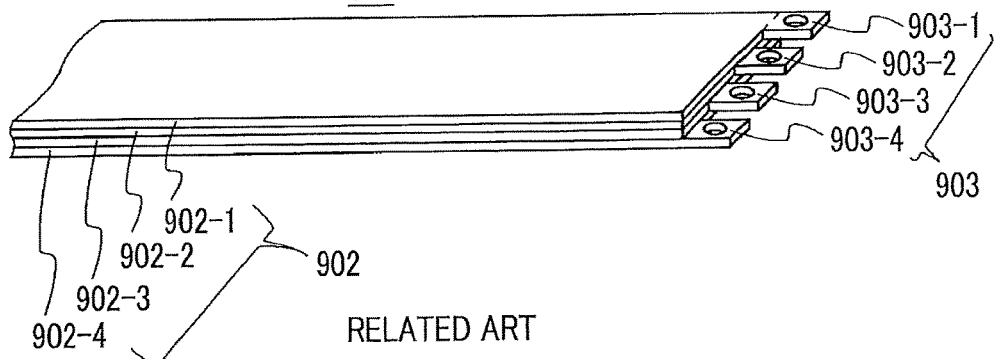
FIG. 5A is a perspective view of a laminated flat electric wire, as an example of a branch structure of the related art.
Figure 5B:
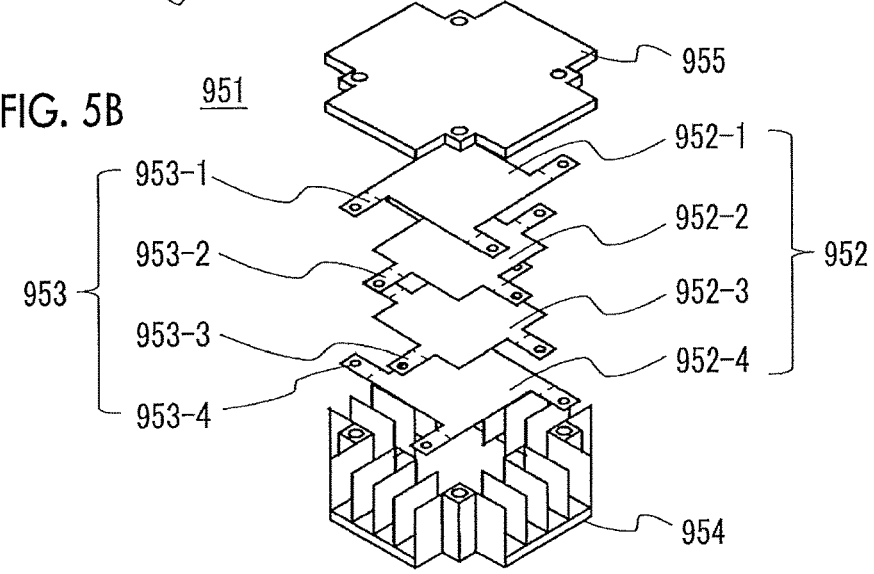
FIG. 5B is an exploded perspective view of a branch box, as an example of the branch structure of the related art.
Figure 5C:
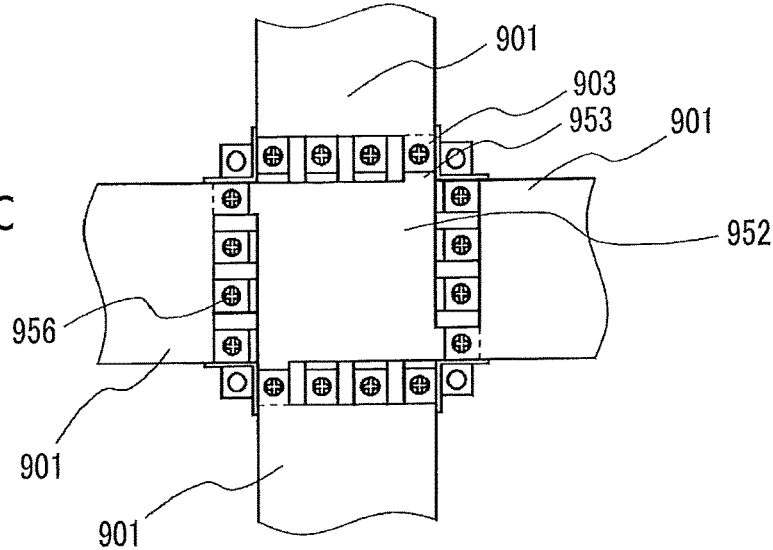
FIG. 5C is a plan view showing a state where the laminated flat electric wires are mounted on the branch box, as an example of the branch structure of the related art.

FIG. 4A to FIG. 4C show a state where the sets of laminated flat electric wires 1 combined as described above are mounted on the branch box 51. Here, as an example, as the sets of laminated flat electric wires 1, for example, the laminated flat electric wires 1A and 1B are prepared two by two, and the laminated flat electric wires 1A and 1B are combined as described above, whereby two sets of combinations are created and one set of the two sets is reversed, as shown in FIG. 4A. As shown in FIG. 4B, alignment is performed such that the bolts 52 of the substrate 53 of the branch box pass through the holes of the tabs 3 of the respective sets, and as shown in FIG. 4C, the sets of laminated flat electric wires 1A and 1B are fixed with nuts 54 to be mounted on the branch box 51. In the step of fixing the sets of laminated flat electric wires 1A and 1B with the nuts 54, the respective tabs 3 through which the same bolt 52 passes are electrically connected in contact with each other. In the fixing step, a part of each tab 3 of each set is further deformed in a direction in which the tabs 3 come into contact with each other. However, the thickness is suppressed in advance, and thus the fixing can be performed in a state where a distortion is small due to a small difference in the amount of deformation of each tab 3 until the tabs 3 come into contact with each other. As described above, when two types of laminated flat electric wires 1A and 1B are prepared as the types of the laminated flat electric wires, suitable mounting on the branch box 51 becomes possible.

The lamination order of the flat electric wires 2 or the arrangement order of the tabs 3 in the laminated flat electric wire 1 described above is merely an example and may be performed to be appropriately deformed. A method of mounting the laminated flat electric wire 1 on the branch box 51 is also not limited to the method described above, and for example, instead of combining two laminated flat electric wires 1 in advance, the laminated flat electric wires 1 may be individually mounted on the branch box 51. The number and directions of the laminated flat electric wires 1 that are branched by being mounted on the branch box 51 are also not limited, and the laminated flat electric wires 1 may be branched in one direction, two directions, or three directions, among the extending direction and two orthogonal directions. In the example described above, four or less laminated flat electric wires 1 can be suitably fixed to the branch box 51. A method of fixing the tab 3 is also not limited to the fastening with the nut 54, and other methods may be used. The number of flat electric wires 2 that are included in the laminated flat electric wire 1 and the number of bolts 52 of the branch box 51 are also not limited to four pieces described above, and the same branch structure can be implemented as long as each of the number of flat electric wires 2 and the number of bolts 52 is two or more pieces. As long as the position of the hole provided in each tab 3 is the same as the position described above, the relationship between the lengths of the respective tabs 3 is not limited and may be the same, for example. When the number of laminated flat electric wires 1 that are fixed through the branch box 51 is two, the positions of the holes of the tabs 3 may not be on a straight line. As described above, the disposition of the bolts 52 and the disposition of the holes of the tabs 3 can be appropriately modified as long as the position of each bolt 52 and the position of the hole of each tab 3 of each laminated flat electric wire 1 correspond to each other in a state where two or more laminated flat electric wires 1 are disposed in different directions when viewed from each bolt 52, and each tab 3 of each laminated flat electric wire 1 can be connected to each bolt 52.

Effects

According to the embodiment of the disclosure, it is possible to realize a branch wiring structure in which laminated flat electric wires extending in four directions can be connected to each other with the same number of bolts and nuts or the like as the number of flat electric wires included in the laminated flat electric wire. By the above, it is possible to simplify a structure by reducing the number of parts as compared with a normal branch box using a bus bar, and it is possible to reduce the volume and weight of the branch box. It is also possible to reduce the number of steps for mounting. For this reason, it becomes possible to suitably mount and dispose the laminated flat electric wire on a vehicle or the like.

In the laminated flat electric wire, by sandwiching an electric power line or a signal line between ground wires provided on an upper layer and a lower layer thereof, it is possible to reduce noise in the electric power line or the signal line. When the disclosure is applied to the laminated flat electric wire configured as described above, it is possible to suitably mount the laminated flat electric wire on a vehicle or the like, and it is possible to improve the quality of electric power supply or various kinds of communication.

The disclosure is useful for electrical wiring in a vehicle or the like.

What is claimed is:

1. A branch structure of a laminated flat electric wire, the branch structure comprising:
   a laminated flat electric wire in which two or more plate-shaped flat electric wires are laminated, the laminated flat electric wire having, at at least one end in an extending direction, tabs each extending from each of the flat electric wires, each of the tabs being provided with a hole, the tabs being provided so as not to overlap each other in a plan view as viewed in a direction along a lamination direction of the laminated flat electric wire, and the holes of the tabs being disposed at positions different from each other in a direction orthogonal to the extending direction of the laminated flat electric wire; and
   a branch box having a same number of rod-shaped members as the number of tabs, the rod-shaped members being disposed at positions corresponding to the positions of the holes of the tabs,
   wherein the branch structure is configured such that the tabs through which a same rod-shaped member passes are electrically connected to each other by fixing two or more laminated flat electric wires to each other by passing each of the rod-shaped members through a corresponding hole of the tabs in a state where the two or more laminated flat electric wires extend from the branch box in opposite directions from each other or directions orthogonal to each other.

2. The branch structure according to claim 1, wherein:
   the tabs of the laminated flat electric wire have different lengths and are provided to be arranged in order of a length in a width direction of the laminated flat electric wire in the plan view as viewed in the direction along the lamination direction of the laminated flat electric wire;
   the hole is provided in a vicinity of a tip portion of the tab;
   in a set of laminated flat electric wires that is mounted in a state of extending in opposite directions from each other from the branch box, in the laminated flat electric wire on one side of the branch box, each of the rod-shaped members passes through a tab in length order starting from a shortest tab, from a first end toward a second end of disposition of the rod-shaped members, and in the laminated flat electric wire on the other side of the branch box, each of the rod-shaped members passes through a tab in length order starting from a longest tab, from the first end toward the second end of disposition of the rod-shaped members; and the tabs of the laminated flat electric wires, through which the same rod-shaped member passes, extend from the flat electric wires that are at a same lamination position.

3. The branch structure according to claim 1, wherein:

the holes of the tabs are disposed at predetermined intervals on a straight line having an inclination of 45° with respect to the extending direction of the laminated flat electric wire in the plan view as viewed in the direction along the lamination direction of the laminated flat electric wire; and four or less laminated flat electric wires are fixed to the branch box.

4. The branch structure according to claim 1, wherein the rod-shaped member is a bolt.

* * * * *